United States Patent [19]
Dennis et al.

[11] Patent Number: 6,072,919
[45] Date of Patent: Jun. 6, 2000

[54] APPARATUS AND METHOD FOR IMPROVING THE FREQUENCY RESPONSE OF MODULATORS BASED ON THE SAGNAC INTERFEROMETER

[75] Inventors: Michael L. Dennis; William K. Burns, both of Alexandria; Irt N. Duling, III, Round Hill, all of Va.; Robert P. Moeller, Fort Washington, Md.

[73] Assignee: The United States of America as represented by the Secretary of the Navy, Washington, D.C.

[21] Appl. No.: 09/005,481

[22] Filed: Jan. 12, 1998

[51] Int. Cl.[7] .................................................. G02F 1/035
[52] U.S. Cl. ...................... 385/3; 385/1; 385/9; 385/15; 385/41; 385/45
[58] Field of Search ........................ 385/3, 1–15, 39–46

[56] References Cited

PUBLICATIONS

M.L. Dennis et al., Bias Drift–Free Intensity Modulator for 50–500 MHz Operation, abstract submitted for the Seventh Annual DARPA Symposium on Photonic Systems for Antenna Applications, held Jan. 14–16, 1997.

M.L. Dennis et al., Bias Drift–Free Intensity Modulator for 50–500 MHz Operation, proceedings paper from the Seventh Annual DARPA Symposium on Photonic Systems for Antenna Applications, held Jan. 14–16, 1997.

*Primary Examiner*—Phan T. H. Palmer
*Attorney, Agent, or Firm*—Barry A. Edelberg; Edward F. Miles

[57] ABSTRACT

An optical method and apparatus particularly useful as an intensity modulation system, in which two phase modulators are placed in the loop of a Sagnac interferometer. Selective placement of the modulators, and the amplitude of any modulation signal input to the modulators, varies the bandwidth and frequency response of the system. In a preferred embodiment, the ratio of the optical distances of the modulators from interferometric midpoint, and the ratio of modulation signal amplitudes, is about 3:1, which serves to broaden and flatten the frequency response of the system.

16 Claims, 3 Drawing Sheets

6,072,919

APPARATUS AND METHOD FOR IMPROVING THE FREQUENCY RESPONSE OF MODULATORS BASED ON THE SAGNAC INTERFEROMETER

BACKGROUND OF THE INVENTION

The capability of modulating the intensity of light in a fiber at high frequencies, e.g. RF or microwave frequencies, is essential to the development of a variety of advanced electromagnetic sensors, to the analog transmission of information over fiber, and to optical signal processing. A variety of techniques have been developed, the most successful being the integrated optic Mach-Zehnder interferometer implemented on lithium niobate. The Mach-Zehnder interferometer is an optical device wherein input light is split and travels along two continuous paths, and is interfered. The two optical paths may be of different lengths, so that the two beams may interfere constructively or destructively. Lithium niobate is an electro-optic material, such that its index of refraction, and thus the optical path length traveled by light passing through the material, may be varied by the application of an electric field. In this manner, the Mach-Zehnder interferometer with a lithium niobate modulator effectively acts as an amplitude modulator of the optical signal propagating in the interferometer.

Despite the broad application of Mach-Zehnder amplitude modulators, they have a number of drawbacks, chief among which is bias drift. Typically systems would require the modulator to operate at particular point in its transmission characteristic, i.e. at a particular bias. For example, for linear voltage response as is required in analog systems (such as cable television distribution networks, or radar systems), the Mach-Zehnder modulator is operated at the 90° (quadrature) phase bias. Improper bias causes undesirable effects, such as an increase in the harmonic distortion of the transmitted optical signal. In general, it is impossible to fabricate a modulator with the proper intrinsic bias. Thus the bias is usually set by application of a DC voltage. However, the required bias voltage may vary over time due to external environmental factors (e.g. temperature, acoustic effects), or internal factors (intrinsic field screening by long-term charge transport in the modulator's layers). Both effects can easily swing the bias phase over a full $2\pi$ radians (360°) on short time scales, so that some means of complicated feedback controlled bias tracking is essential to extend the usable lifetime of a modulator in practical application. This has spurred considerable research-mostly unsuccessful-towards the development of an intrinsically more stable electro-optic modulator. Thus other approaches which can address these problems would be most welcome.

One such approach employs a Sagnac interferometer, similarly biased at quadrature, with an electro-optic phase modulator disposed in the interferometer's loop. The Sagnac interferometer operates by counterpropagating signals in the same optical path before interfering them. Thus any slow drift in material parameters (i.e. much slower than the period of propagation though the interferometric loop) will cancel. Recently, relatively broadband and linear operation of a Sagnac interferometric amplitude modulator (or "SIAM") has been demonstrated at modulating frequencies in excess of 500 MHz. See, U.S. patent application Ser. No. 08/690,035, U.S. Pat. No. 5,596,171, filed Jul. 31, 1996, and currently pending; the substance of this application is incorporated herein by reference. Unfortunately, the frequency response of this configuration is not flat. It is thus of interest to extend the effective operating range of Sagnac based modulators to lower frequencies, and to flatten the frequency response of such modulators.

SUMMARY OF THE INVENTION

Accordingly, an object of the invention is to improve the low frequency response of modulators based on the Sagnac interferometer.

Another object is to do this for frequencies less than 500 MHz.

Another object is to improve the flatness of the frequency response of such modulators.

In accordance with these and other objects made apparent hereinafter, the invention concerns an apparatus and method in which a Sagnac interferometer has at least two phase modulators, or equivalents thereof, disposed within its arms, and in which one of the modulator is disposed at one preselected optical distance from the optical midpoint of the interferometer, and the other one of the modulators is disposed at a second preselected optical distance from the optical midpoint. A judicious selection of the two preselected distances permits one to select the bandwidth of the overall system, and to selectably modify its frequency response. In preferred embodiments, the distances are odd integer multiples of one another, and the magnitude of the modulation signal applied to the modulators is the same integer multiple, which causes the frequency response to become more flat over the bandwidth of interest.

These and other objects are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings, wherein:

DETAILED DESCRIPTION

Figure 1:
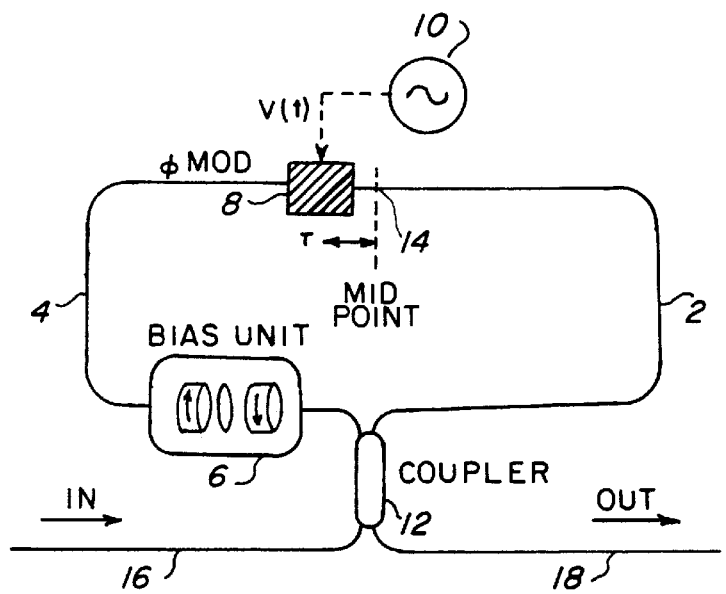
FIG. 1 is a schematic of a SIAM, employing one phase modulator offset from the interferometric midpoint.
Figure 3:
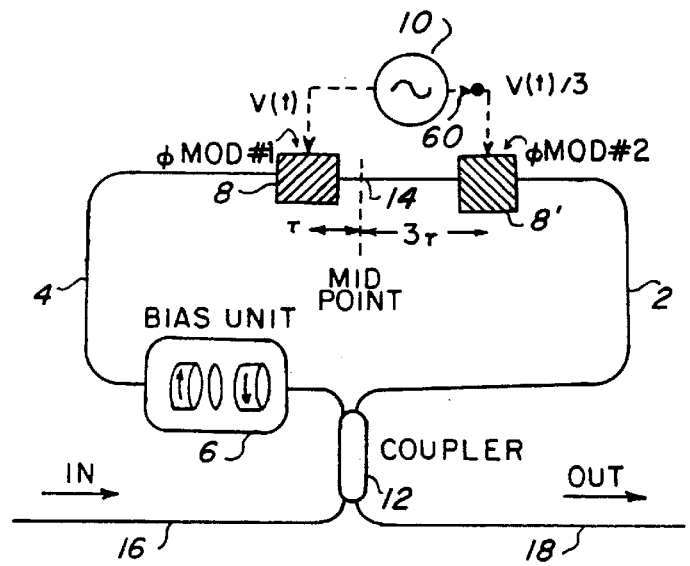
FIG. 3 is a schematic of Sagnac-based modulator according to one embodiment according to the invention.
Figures 5, 6:
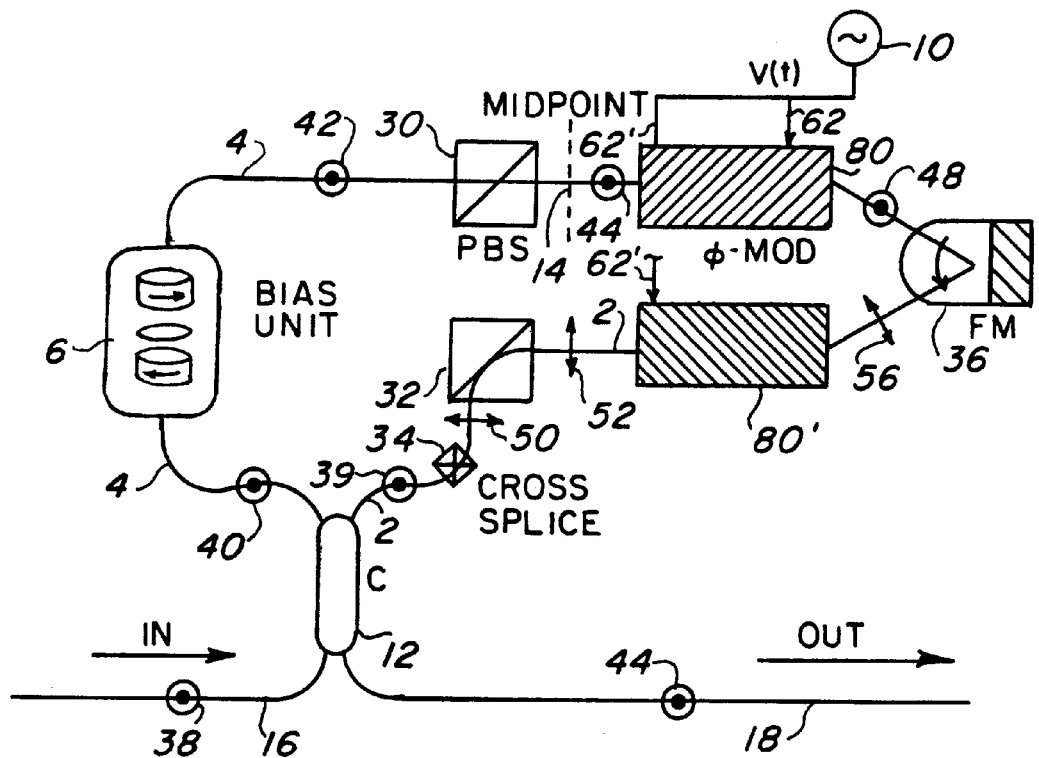
FIG. 5 is a schematic of a Sagnac-based modulator according to another embodiment of the invention.
FIG. 6. is a schematic of a Sagnac-based modulator according to another embodiment of the invention.

With reference to the drawing figures, wherein like numbers indicate like parts throughout the several views, FIG. 1 shows a prior art SIAM having one electro-optic modulator, the operation of which provides a better understanding of the embodiments of FIGS. 3, 5, and 6. Optical fibers 2 and 4 are coupled together to form the respective arms 2, 4 of a Sagnac interferometer, having input-output coupler 12, and optical midpoint 14, the latter being the point at which light launched simultaneously into respective arms 2 and 4 would cross paths. Phase modulator 8 is disposed in arm 4, and offset from optical midpoint 14 by an optical distance $\tau$, i.e. the time which light would take to travel from midpoint 14 to modulator 8. Arm 4 also has a bias unit 6 to set the quiescent phase at which the system operates, i.e. at or near phase quadrature. A time varying modulation signal V(t) is input to phase modulator 8, which could e.g. be an RF or microwave signal from a radar system, a satellite, or a cable television distribution system.

In operation, an optical carrier signal is injected into the system via input 16. Coupler 12 splits the carrier into substantially equal portions which counter propagate through arms 2, 4, the signal launched in arm 4 propagating clockwise, the signal launched into arm 2 propagating counterclockwise, and in the process both passing through modulator 8. The voltage V(t) of signal 10 causes the index of refraction of the electro-optic material in modulator 8 to vary in accordance with the voltage, thus modulating the time it takes a signal from arms 2, 4 to traverse modulator 8. In this manner signal from member 10 phase modulates the respective signals counterpropagating in arms 2, 4. However, because modulator 8 is offset from optical midpoint 14, the magnitude of V(t) will not be the same for each of the counterpropagating signals, resulting in a phase difference between them. These out of phase signals recombine and interfere at coupler 12, and the resultant interference signal output via fiber line 18. Of course, coupler 12 splits the output equally between lines 16 and 18 and with the output at 16 being complimentary to that at 18, typically the output at 18 is used to separate the output from the input.

The transmissivity T of the output at 18, or for any Sagnac interferometer, depends on the phase difference between the counterpropagating signals, in particular:

$$T \alpha \sin^2(\tfrac{1}{2}\Delta\phi)$$

where $\Delta\phi$ is the phase difference in the counterpropagating signals at coupler 12. If $V(t)=V_0\cos(\Omega t)$, then $$\Delta\phi=[V(t+\tau)-V(t-\tau)], \text{ i.e.}$$

$$\Delta\phi=\pi(V_0/V_{90})\{\cos[\Omega(t+\tau)]-\cos[\Omega(t-\tau)]\}$$

where $V_\pi$ is the voltage which causes modulator 8 to produce a $\pi$ radian (180°) phase shift. Expanding and simplifying, one gets:

$$\Delta\phi=-2\pi(V_0/V_\pi)[\sin(\Omega\tau)\sin(\Omega t)]$$

Defining F as $-2\pi(V_0/V_\pi)\sin(\Omega\tau)$, then:

$$\Delta\phi=F\sin(\Omega t)$$

Figure 2:
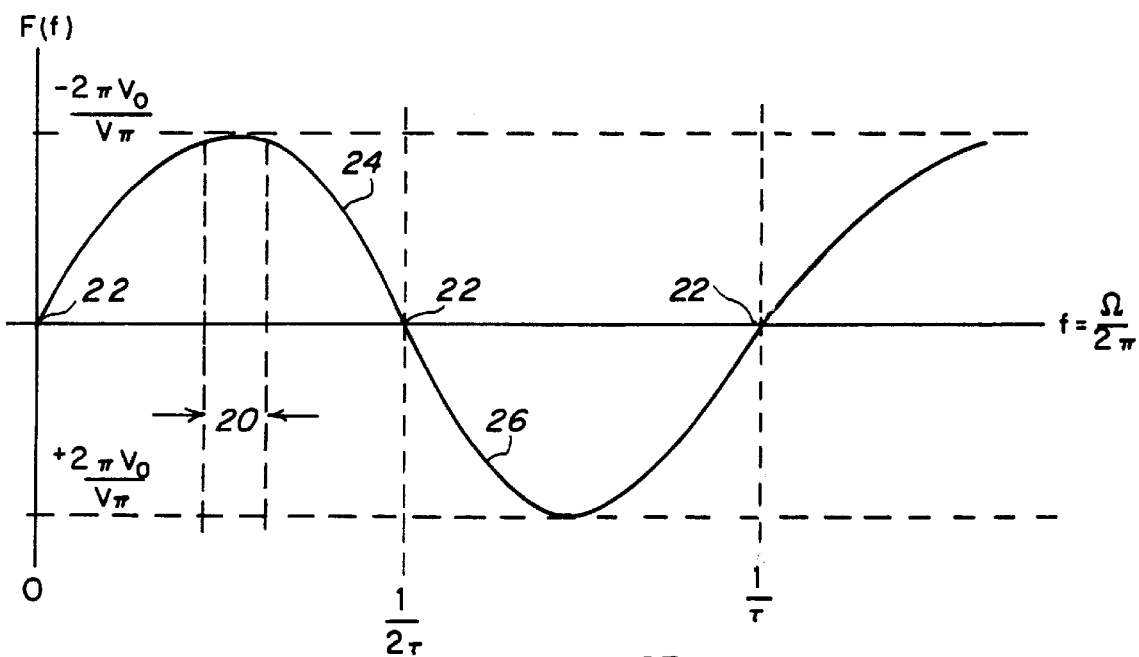
FIG. 2 is a graph of the frequency response of the device of FIG. 1.

From this, one can see that the spectral response of $\Delta\phi$, and hence that of interferometer transmissivity T, varies with modulation frequency $\Omega$. FIG. 2 illustrates this, by presenting a plot of F as a function of modulator frequency f (f, of course, being $\Omega/2\pi$). As seen in FIG. 2, the frequency response 24 is not flat, and has periodic nulls at $f=N/2\tau$, N being an integer. The negative-going portions of F(f) such as at 26 indicates a 180° phase reversal, i.e. output 18 responsive to frequencies between $1/2\tau$ and $1/\tau$ are 180° out of phase with that responsive to frequencies between zero and $1/2\tau$. One can get relatively flat responsivity only in small bandwidths such as 20, and in the vicinity of nulls 22 one gets virtually no responsivity at all.

The embodiment of FIG. 3 improves upon this, and shows a SIAM like that of FIG. 1, but with an additional electro-optic modulator 8' disposed an optical distance $3\tau$ from interferometer midpoint 14. Modulation signal 10 is fed in parallel to both modulators 8, 8', with the magnitude of signal 10 reduced to one third for modulator 8', and inverted by invertor 60. The SIAM of FIG. 4 operates as does that of FIG. 1, with the counterpropagating signals being phase modulated twice. The phase difference $\Delta\phi$ between the counterpropagating signals is:

$$\Delta\phi=2\pi(V_0/V_\pi)\{[\cos[\Omega(t-\tau)]-\tfrac{1}{3}\cos[\Omega(t+3\tau)]]-[\tfrac{1}{3}\cos[\Omega(t+3\tau)]-\cos[\Omega(t+3\tau)]]\}$$

which simplified reduces to:

$$\Delta\phi=2\pi(V_0/V_\pi)[\sin\Omega t\sin(\Omega\tau)+\tfrac{1}{3}\sin(\Omega t)\sin(\Omega\tau)]$$

Figure 4:
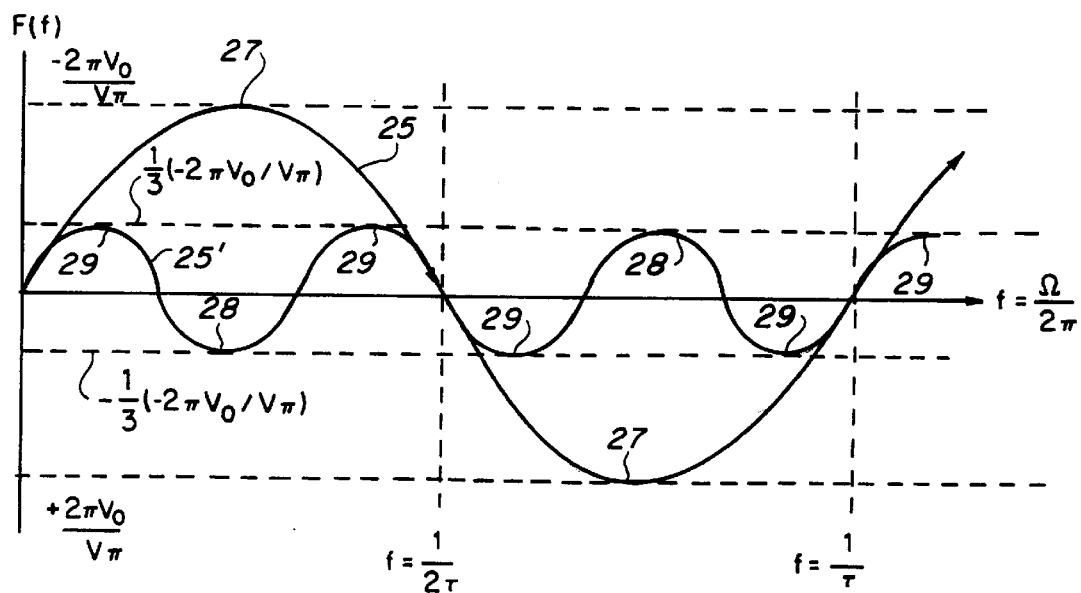
FIG. 4 is a graph of the frequency response of the device of FIG. 3.

Thus, the resultant frequency response curve F(f) is the linear superposition of the frequency responses which each of the modulators 8, 8' would produce individually, i.e.:

$$F(f)=F_8(f)+F_{8'}(f)=-2\pi(V_0/V_{90})[\sin(\Omega\tau)+\tfrac{1}{3}\sin(3\Omega\tau)]$$

where $F_8(f)$ is the frequency response of modulator 8 acting alone, and $F_{8'}$ is the frequency response of modulator 8' acting alone. FIG. 4 plots $F_8(f)$ (curve 25) and $F_{8'}(f)$ (curve 25') together.

Because the magnitude of the modulation signal input to member 8' is a third of that input to member 8, the magnitude of curve 25' is a third that of curve 25. Because the net frequency response F(f) is the pointwise sum of curves 25 and 25', peaks 29 of curve 25' will increase net response F(f) at low frequencies, and in the vicinity of frequency nulls at $f=N/2\tau$. Also, peaks 28 of curve 25' will reduce peaks 27 of curve 27'. The net result is that over the bandwidth $f=0$ to $1/(2\tau)$, the overall response is flattened in the middle, and increased at either band edge. Thus for any practical application, one would choose $\tau$ according to the bandwidth one needs. For the bandwidth of, e.g., zero to 500 MHz, selection of $\tau$ on the order of a nanosecond would be appropriate.

The choice of a $3\tau$ offset for modulator 8', and an associated drive voltage that is one third that of modulator 8, is considered optimal. This is motivated by noting that a perfect frequency response would be perfectly flat within the bandwidth of interest, indeed would look like a square wave as a function of frequency. The Fourier series of a square pulse as a function of frequency has harmonic components $\sin(\omega_0 t)$, $\sin(3\omega_0 t)/3$, $\sin(5\omega_0 t)/5$, etc. Curves 25 and 25' represent the first two harmonics of this Fourier series. Of course, one could add more modulators at $5\tau, 7\tau$, etc. with modulation signal attenuations of $1/5, 1/7$, etc. and incrementally flatten F(f) yet further. However to do so is costly in equipment, and the improvement for each additional modulator would be less and less. One could, within the spirit of the invention, have offset ratios and drive voltage ratios between modulators 8 and 8' other than 3:1, 5:1, 7:1, etc. However, the more one deviates from the arrangement dictated by the Fourier analysis, above, the more performance will depart from the flattest response. Experience shows that modulator drive ratios in the range of 2.5:1 to 5:1 are advantageous; the offset ratio should, however, be within approximately 10% of the specified value, i.e., in the range of 3:0.9 to 3.0:1.1.

Modulators 8, 8' are preferably lithium niobate devices because lithium niobate electro-optical devices are well known. However, any appropriate modulator will suffice. In principal, this includes all semiconductor integrated optic devices using the electro-optic effect, semiconductor phase modulators utilizing carrier nonlinearities (based on semiconductor optical amplifiers), acousto-optic based fiber phase modulators, phase modulators using a mechanical stretch of the fiber, etc.

FIG. 5 illustrates another embodiment employing lithium niobate modulators 80, 80' in respective interferometer arms 4, 2, modulator 80 being an optical distance τ from interferometer midpoint 14, and modulator 80' being a distance 3τ. Disposed between coupler 12 and modulator 80 is polarization beam splitter 30, whose principal axes are disposed to pass only transverse magnetic (TM) optical modes, i.e. modes whose polarization state is such that its magnetic field lies in the plane of the drawing figure, and whose electric field is perpendicular thereto. A TM mode is indicated schematically in FIG. 5 by a circled dot, e.g. 40, 42, etc. Similarly, disposed between coupler 12 and modulator 80' is polarization beam splitter 32, whose principle axes are disposed to pass only transverse electric (TE) optical modes, i.e. modes whose polarization state is such that its electric field lies in the plane of the drawing figure, and whose magnetic field is perpendicular thereto. A TE mode is indicated by transverse arrows, 50, 52, 56. Disposed optically between modulators 80, 80' is Faraday mirror 36. Modulation signal V(t) is fed in parallel to modulators 80, 80' via lines 62, 62'. However, because both modulators 80, 80' are on the same side of interferometer midpoint 14, proper operation requires that the modulation signals be in phase.

In operation, input 16 receives a TM optical signal (38) which coupler 12 splits (39, 40). Member 34 rotates the polarization of counter clockwise propagating signal 39, making it TE polarized (50). Member 34 is preferably a fiber cross-splice because of its simplicity and inexpensiveness, although any reciprocal scheme to rotate signal polarization will do as well. Because both signals 42 and 50 are on-axis for their respective beam splitters 30, 32, both signals pass the splitters (44, 52). Clockwise propagating signal (44) traverses modulator 80 where it is phase modulated by signal 62, then passes (48) to Faraday mirror 36, which rotates its polarization to that of a TE mode (56), passes through modulator 80' where it is phase modulated by 62' and thence to beam splitter 32 (52, 50). Member 34 then converts this clockwise propagating signal to a TM mode (39) prior to the arrival at coupler 12. The counterclockwise propagating signal enters interferometer arm 2 (39), is converted by member 34 to a TE mode, passes on-axis through beam splitter 32 (52) and modulator 80 where it is modulated by signal 62' and exits (56) onto Faraday mirror 36. Mirror 36 rotates the polarization of the counterclockwise propagating signal by 90°, converting it to a TM mode (48) which passes through modulator 80 where it is modulated by signal 62, exits on-axis to beam splitter 30 (44) and thence to coupler 12 (42, 40, etc.), where it interferes with the clockwise propagating signal.

Because modulators 80, 80' are respectively τ and 3τ from midpoint 14, the frequency response F(f) of the device of FIG. 5 will, like that of the device of FIG. 3, be the superposition of two sinusoidal components like curves 25 and 25' of FIG. 4, one component having a period of 1/τ, the other a period of 1/(3τ). Additionally, the ratio of electro-optic coefficients $r_{13}/r_{11}$ in lithium niobate is, fortuitously, 0.28, about one-third. This means that, like the embodiment of FIG. 2, when each counterpropagating signal has traversed both phase modulators, each will have undergone modulation by a signal whose amplitudes have about the ratio 3:1, as in the embodiment of FIG. 3. In consequence, the frequency response F(f) of the device of FIG. 5 will be very close to that illustrated in FIG. 4, with its attendant advantages. Note that any optical element which exchanges the TE and TM polarizations may be substituted for Faraday mirror 36. Note that this embodiment does not employ an invertor, such as member 60 of the embodiment of FIG. 3. As a general matter, to get the sort of bandwidth flattening discussed above, one needs such an invertor if both phase modulators lie on opposite sides of midpoint 14; otherwise one needs no invertor.

FIG. 6 illustrates another embodiment, similar to that of FIG. 5 but with only one beam splitter 82, one phase modulator 81, and with the addition of Faraday mirror 84. Modulator 81 is disposed so as to be equidistant between midpoint 14 and Faraday mirror 84. The principal axes of beam splitter 82 are disposed so that a TM polarized signal propagating clockwise in arm 4 passes through to modulator 81, and a counterclockwise propagating signal in arm 2 also similarly passes through. As with the embodiment of FIG. 5, TM input signal 38 splits at coupler 12, and counter propagates in arms 2, 4. The TM signal propagating counterclockwise in arm 2 is converted to a TE signal by member 34, with the result that signals in both arms 2 and 4 arrive at beam splitter 82 on axis, and are both passed to modulator 81, where the signals are phase modulated by signal 10 twice, once going towards mirror 84, and once returning from mirror 84. Faraday mirror operates to reverse the polarization of signals exiting modulator 81, with the result that each signal is passed through modulator 81 once as a TE mode, and once as a TM mode. Because modulator 81 is equidistant between midpoint 14 and mirror 84, the transit time of a signal from midpoint 14 to mirror 84 and back to modulator 81 will be three times that of the transit time from midpoint 14 directly to modulator 81, as in the embodiments of FIGS. 3 and 5, with the same result. Because modulator 81 is of lithium niobate, the magnitude of the modulation of the TE to TM signal is about 3:1, as discussed above concerning FIG. 5, with the net result that the embodiment of FIG. 6 operates essentially the same as that of FIG. 5, but with less hardware.

Note that the foregoing discussion of FIGS. 5 and 6 pertains specifically to an embodiment using a Z-cut titanium diffused lithium niobate phase modulator. Alternatively, a Y-cut device may be substituted; in that case, the roles of the TE and TM polarizations are reversed. The embodiment of FIG. 5, like the embodiment of FIG. 3, may be implemented using any pair of phase modulators of any type yielding phase modulation in the approximately 3:1 ratio. The embodiment of FIG. 6 depends particularly on the property of lithium niobate that the relative phase modulations for the two optical polarizations is close to 3:1, and on the specific property of titanium diffused waveguides that both polarizations are guided (unlike proton exchanged waveguides, the primary commercially available alternative technology). Alternatively, any waveguide technology in lithium niobate which guides both polarizations, based for example on in-diffusion of other transition metals which yield transparent guides at the wavelength of interest, would be acceptable. Similarly, any substrate material which yields an approximately 3:1 ratio of the phase modulations is acceptable as well.

The invention has been described in what is considered to be the most practical and preferred embodiments. It is recognized, however, that obvious modifications to these embodiments may occur to those with skill in this art. Accordingly, the scope of the invention is to be discerned from reference to the appended claims, wherein:

We claim:

1. An apparatus comprising:

a Sagnac interferometer; and at least two phase modulators, one of said modulators being disposed in said interferometer at one preselected optical distance from the optical midpoint of said interferometer, the other of said modulators being disposed in said interferometer at a second preselected optical distance from the optical midpoint of said interferometer.

2. The apparatus of claim 1, further comprising means for directing a first modulation signal to said one of said at least two phase modulators, and a second modulation signal to said other of said at least two modulation signals, said first and said second modulation signals being the same waveform and having the same phase with respect to one another, and wherein the ratio of the respective magnitudes of said first and said second modulation signal is of a preselected value.

3. The apparatus of claim 2, wherein said ratio of said respective magnitudes is substantially equal to a member of the set consisting of odd integers.

4. The apparatus of claim 3, wherein said ratio of said respective magnitudes is about 3 to 1.

5. The apparatus of claim 2, wherein said ratio of said first preselected optical distance and said second preselected optical distance is about equal to said ratio of said respective magnitudes.

6. The apparatus of claim 5, wherein both of said ratios are about equal to an odd integer.

7. The apparatus of claim 6, wherein said integer is 3.

8. The apparatus of claim 2, wherein said ratio of said respective magnitudes is between about 2.5 to 1 and 5 to 1.

9. The apparatus of claim 8, wherein said ratio of said respective magnitudes is between about 3 to 0.9 and 3 to 1.1.

10. The apparatus of claim 1, wherein the ratio of said first preselected optical distance and said second preselected optical distance is about equal to a member of the set consisting of odd integers.

11. The apparatus of claim 10, wherein said ratio is about 3 to 1.

12. The apparatus of claim 1, further comprising means effective to direct a transverse magnetic polarized signal as input to said one of said modulators, and means effective to direct a transverse electric polarized signal as input to said other of said modulators.

13. The apparatus of claim 12, wherein said polarization rotator is a Faraday mirror.

14. The apparatus of claim 1, further comprising a polarization beam splitter and a polarization rotator, and wherein said at least two modulators is a unitary modulator of lithium niobate disposed optically between said beam spitter and said rotator.

15. The apparatus of claim 1, wherein each of said modulators is of lithium niobate, said interferometer further comprising a polarization rotator disposed optically between each of said modulators.

16. A method comprising:
   employing a Sagnac interferometer, said interferometer comprising at least two phase modulators, one of said modulators being disposed in said interferometer at one preselected optical distance from the optical midpoint of said interferometer, the other of said modulators being disposed in said interferometer at a second preselected optical distance from the optical midpoint of said interferometer;
   applying a first modulation signal to said one of said modulators, and applying a second modulation signal to said other of said modulators, said first and said second modulation signal being the same waveform and having the same phase with respect to one another, the respective magnitudes of said first and said second modulation signal being of a preselected value.

* * * * *